United States Patent [19]

Hans et al.

[11] Patent Number: 5,075,535
[45] Date of Patent: Dec. 24, 1991

[54] HEATED AND REFLECTING AUTOMOBILE GLAZING

[75] Inventors: Alfred Hans, Roetgen; Gunther Termath, Gelsenkirchen, both of Fed. Rep. of Germany

[73] Assignee: Saint Gobain Vitrage International, Courbevoie, France

[21] Appl. No.: 556,762

[22] Filed: Jul. 23, 1990

[30] Foreign Application Priority Data

Jul. 22, 1989 [DE] Fed. Rep. of Germany ....... 3924276

[51] Int. Cl.$^5$ ............................................. H05B 3/06
[52] U.S. Cl. .................................. 219/203; 219/522; 52/171
[58] Field of Search ............... 219/202, 203, 543, 522, 219/213, 547; 338/307–309; 52/171; 65/59.31

[56] References Cited

U.S. PATENT DOCUMENTS

| | | | |
|---|---|---|---|
| 2,628,927 | 2/1953 | Colbert et al. | 219/203 |
| 2,761,945 | 9/1956 | Colbert et al. | 219/203 |
| 3,813,519 | 5/1974 | Jochim et al. | 219/203 |
| 3,885,855 | 5/1975 | Gross | 350/1 |
| 4,507,547 | 3/1985 | Taga et al. | 219/522 |
| 4,584,236 | 4/1986 | Colmon et al. | 219/543 |
| 4,847,157 | 7/1989 | Goodman et al. | 428/426 |
| 4,976,503 | 12/1990 | Woodard | 52/171 |

Primary Examiner—Bruce A. Reynolds
Assistant Examiner—John A. Jeffery
Attorney, Agent, or Firm—Pennie & Edmonds

[57] ABSTRACT

A glazing which is electrically heated and reflective of heat rays is equipped on the surface directed toward the passenger compartment of a vehicle with conductors obtained by baking metallic silver enamel and also with a semi-reflecting layer consisting of a metal compound which is resistant to abrasion and corrosion, in particular titanium nitride. The semi-reflective layer of titanium nitride is deposited after baking the enamel conductors by a vacuum deposition technique.

11 Claims, 1 Drawing Sheet

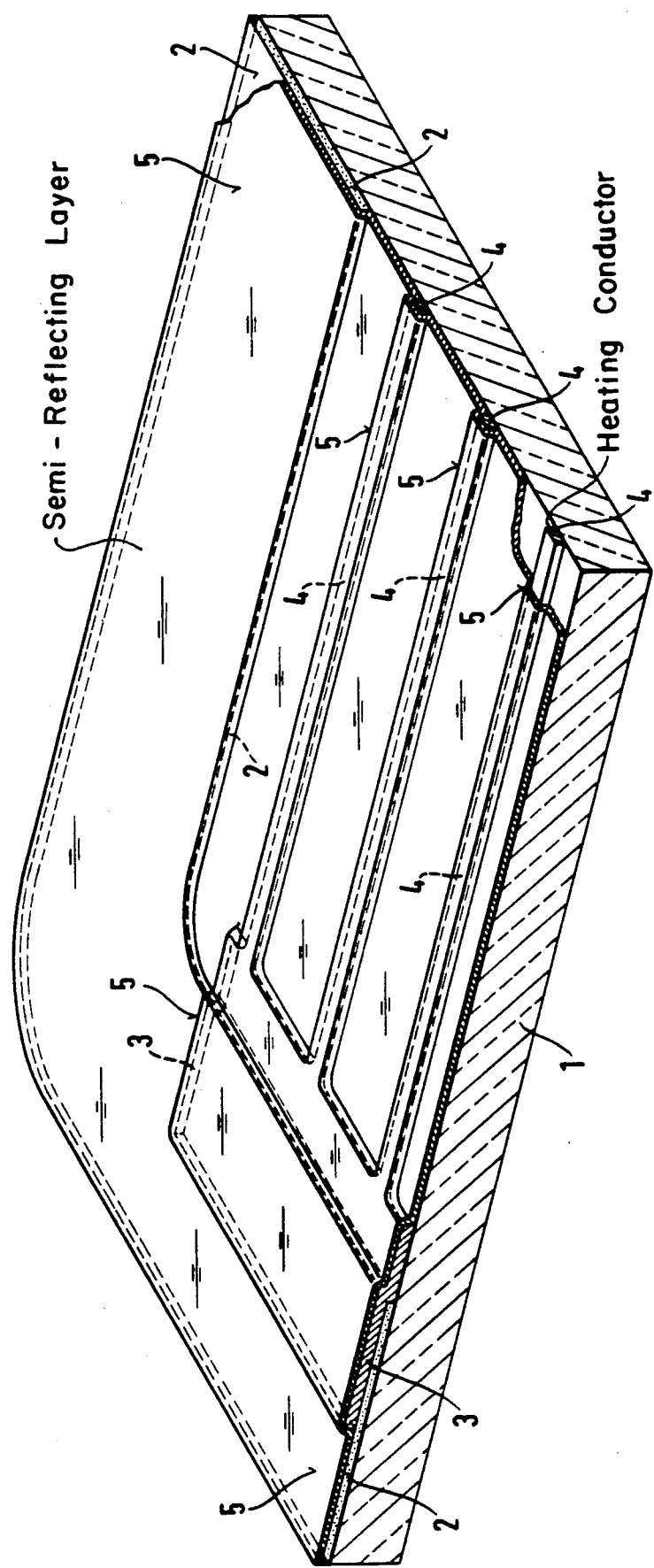

HEATED AND REFLECTING AUTOMOBILE GLAZING

BACKGROUND OF THE INVENTION

The invention relates to an automobile glazing which is electrically heated and reflective of heat rays. The use of electrical heating makes it possible to eliminate both the condensations on the inside face of a glazing and to melt the snow or the ice on their outside face. Heat reflective glazings are advantageously used to keep heat within a vehicle in cold climates and to keep it out in warm climates.

Automobile glazings which perform these functions are equipped with an electrically conductive surface. The deposit which forms this surface consists of several superposed layers, one of them being a metal, for example silver. This surface deposit acts both as a heating element and as a reflecting layer for the sunrays reaching the glazing from the outside and for the heat rays of long wavelength coming from the inside.

Automobile glazings, as a general rule, should have a high transmission factor for the visible light. Since the thin layer constituting the heating resistor is a metal layer, it is necessary that the surface deposit be very thin. Under the conditions which now exist with all the known thin-layer compositions, the electrical resistance of such a layer is so high that such a glazing cannot be heated with the 12-volt potential available in automobiles. Rather, it is necessary to use much higher voltages. To attain these higher voltages, it is necessary to use additional electric equipment which results in increased cost.

It also is known and of current practice to equip an automobile glazing on its inner face with narrow conductors obtained by baking an enamel deposited on the glass. Such glazings use a 12 volt potential to heat the glazing. However, unlike heated glazings equipped with continuous thin layers, they can play no role in solar protection.

Further, it is known according to U.S. Pat. No. 3,885,855 that a glazing that reflects heat can be produced with surface deposits, i.e., by depositing layers of borides, carbides, nitrides, carbon nitrides, as well as suboxides of the following metals: titanium, zirconium, hafnium, vanadium, niobium, tantalum, chromium, molybdenum and tungsten, to the surface. However, because of their relatively high electrical resistance, these layers cannot act as a heating element on the glazing.

SUMMARY OF THE INVENTION

An object of the invention is to provide an automobile glazing which on the one hand has on its entire surface the property of reflecting solar energy and heat rays of long wavelength and which, moreover, can be heated with the line voltage available in conventional vehicles.

The automobile glazing according to the invention is characterized in that its surface on the inside of the passenger compartment is equipped with electric conductors consisting of a metallic silver enamel. Further, this same surface is completely covered by a reflecting layer which covers both the surface of the glass and the conductors. The reflecting layer is deposited by a vacuum process and it comprises abrasion and corrosion-resistant metal compounds belonging to the group consisting of borides, carbides, nitrides, carbon nitrides, as well as suboxides of the metals: titanium, zirconium, hafnium, vanadium, niobium, tantalum, chromium, molybdenum, and tungsten.

According to the invention, the functions of the electrical heating of the glazing and the reflection of the radiation are assumed by two different layers each of which have proven effective in performing their proper function. The semi-reflective layer which covers the surface of the glass and the conductors has a certain electrical conductivity due to the metallic elements that it comprises. Surprisingly, it has been found that the semi-reflective layer not only does not disturb the heating function of the conductors, but also, that it contributes to a more homogeneous distribution of the heating power and that it shows characteristics of adherence to the conductors and to the glass in the transition zone between the conductors. Additionally, the regularity of the semi-reflecting surface layer is not disturbed by the conductors. In this way, automobile glazings are obtained whose heating power, electrical characteristics, reflection performance and heat or solar protection can be modified independently from one another in wide ranges to meet the needs of their use.

The layer reflecting the radiation advantageously has a thickness of 20 to 100 nanometers and a surface resistance of 50 to 600 ohms per square. In addition to these characteristics, its transmission in the visible region goes from 10 to 60% and advantageously from 30 to 50% and its reflection of heat rays, i.e., rays in the spectral region greater than 1 micron, preferably should be from 25 to 80% and advantageously from 40 to 70%.

The results are particularly good when the reflecting layer consists of titanium nitride.

The deposit of the reflecting layer can be performed by one of suitable known methods. The cathode sputtering technique assisted by the magnetic field of a magnetron has proven to be very advantageous in making this deposit.

BRIEF DESCRIPTION OF THE DRAWING

The figure shows in detail a preferred embodiment of the invention. A partial perspective view of a glazing constituted according to the invention is seen there.

DETAILED DESCRIPTION OF THE DRAWING

The automobile glazing shown in the figure is heated and reflecting. Illustratively, it is a rear window which is attached by gluing it directly to the sheet metal in the window opening of the body. The glazing consists of a tempered soda lime silica glass plate 1 with a thickness of about 5 mm. The tempering is a heat tempering. Glazing 1 is equipped with several layers on the side, which, when in position on the vehicle, is on the inside of the passenger compartment.

A frame-shaped layer 2, which consists of an opaque enamel, is seen on glazing 1 along its periphery. One function of frame-shaped layer 2 is to prevent one from seeing through the glazing the glue which secures the glazing to the sheet metal of the automobile. Its second function is to protect the gluing materials from the effects of ultraviolet rays which could lead to their degradation and to their cracking.

The technique of depositing frame-shaped layer 2 is a transfer technique, for example, silk-screening.

The next layer also consists of a hot enamel but is conductive. It is deposited in the form of a collector 3 and narrow wires 4. The narrow wires 4 extend the length of the glazing between collector 3 and an identical collector not shown in the drawing. Collector 3 is deposited essentially on frame-shaped layer 2 but it projects inside the glazing where it joins wires 4. The layer constituting collector 3 and wires 4 is made with an enamel whose composition comprises metallic silver. The enamel is deposited by a silk-screen transfer technique according to a process known in the art. The width of wires 4 as a general rule is between 0.4 and 0.6 mm. Their thickness ranges from 15 to 30 microns.

Surface layer 5 is transparent. It has a uniform thickness of about 30 nanometers both on the surface of the glass and on the opaque layers 3 and 4 which have just been described. Its light transmission in the visible region is about 40% and its surface resistance is on the order of 350 ohms per square. This layer is optically homogeneous and advantageously, among other things, has an excellent abrasion resistance and a good corrosion resistance.

To produce the automobile glazing which has just been described, a flat glass first is cut in the shape which will make it possible to obtain glazing 1. The layer 2 is deposited on the periphery of the plate by silk-screening and then is dried. After the drying of frame-shaped layer 2, collector 3 and wires 4, consisting of the conductive layer itself, are deposited by the same process and then dried. Finally, the glass covered by these various layers is brought to 650 degrees Celsius and is then bent to the desired shape and finally tempered in air. During the heating to the bending temperature, the enamels melt and blend with the surface of the glass.

At the end of the tempering, the glazing equipped with its layers is carefully cleaned and is then introduced into a magnetron cathode sputtering installation. A layer 5 of titanium nitride of a thickness of 30 nanometers is deposited there by reactive cathode sputtering.

Instead of a single layer of titanium nitride, a multiple layer can be deposited if it is desired. Such multiple layers with suitable properties of reflection in the infrared, of transmission in the visible region, of electrical conductivity, and of appearance and behavior are known.

Before being covered by the semi-reflecting layer, collectors 3 and wires 4 can undergo an additional treatment which reduces their electrical resistance and/or improves their appearance. A galvanization method can be used, for example, to deposit a layer of copper and-/or nickel. Such a treatment technique of conductive layers deposited on the glass is standard and well known. It has been found that the advantages obtained by the invention are in the case of heated glazings having undergone such a galvanization treatment. It also has been noted that this treatment in no way modified the vacuum deposition phase which provides the same results on the metals deposited by galvanization.

We claim:

1. An automobile glazing which is electrically heated and reflective of heat rays, characterized in that it comprises, on an inside face, a first layer of narrow electrical conductors which is obtained by baking a metallic silver enamel, the narrow electrical conductors heating the glazing, and a second layer that is resistant to abrasion and corrosion and covers the surface of the glazing and the first layer, the second layer being partially transmissive to visible rays and partially reflective to heat rays.

2. An automobile glazing according to claim 1 wherein said semi-reflecting layer is deposited by a vacuum deposition technique and consists of a metal compound of the group of borides, carbides, nitrides, carbon nitrides and oxides or suboxides of the metals: aluminum, titanium, zirconium, vanadium, chromium, molybdenum and tungsten.

3. An automobile glazing according to claim 1 wherein the semi-reflecting layer has a thickness of 20 to 100 nanometers and a surface electrical resistance of 50 to 600 ohms per square.

4. An automobile glazing according to claim 1 wherein the light transmission of the semi-reflecting layer in the visible region is between 10 and 60% and wherein the reflection in the spectral region greater than 1 micron is between 25 and 70%.

5. An automobile glazing according to claim 1 wherein the semi-reflecting layer consists of titanium nitride.

6. An automobile glazing according to claim 1 wherein the first layer is coated by a metal copper layer deposited by galvanization.

7. An automobile glazing according to claim 1 wherein the semi-reflecting layer is deposited by a magnetron reactive cathode sputtering technique.

8. An automobile glazing according to claim 1 wherein the narrow electrical conductors are between 0.4 and 0.6 mm wide and between 15 to 30 microns thick.

9. An automobile glazing according to claim 1 wherein the first layer is coated by a metal nickel layer deposited by galvanization.

10. An automobile glazing according to claim 1 wherein the first layer is coated by a layer of nickel and copper deposited by galvanization.

11. An automobile glazing which is electrically heated and reflective of heat rays, characterized in that it comprises, on an inside face, a first layer of narrow electrical conductors for heating the glazing, collector means interconnected by the narrow electrical conductors for supplying electrical power thereto, and a second layer covering the surface of the glazing and the first layer, the second layer being partially transmissive to visible rays and partially reflective to heat rays.

* * * * *